United States Patent [19]

Blank

[11] Patent Number: 4,939,642

[45] Date of Patent: Jul. 3, 1990

[54] VIRTUAL BIT MAP PROCESSOR

[75] Inventor: William T. Blank, Palo Alto, Calif.

[73] Assignee: The Board of Trustees of the Leland Stanford Jr. University, Stanford, Calif.

[21] Appl. No.: 426,539

[22] Filed: Oct. 24, 1989

Related U.S. Application Data

[63] Continuation of Ser. No. 306,270, Feb. 1, 1989, abandoned, which is a continuation of Ser. No. 882,793, Jul. 7, 1986, abandoned, which is a continuation of Ser. No. 558,024, Dec. 5, 1983, abandoned.

[51] Int. Cl.[5] ............................................. G06F 15/16
[52] U.S. Cl. ................................. 364/200; 364/231.9; 364/256.8; 364/238.4
[58] Field of Search ... 364/200 MS File, 900 MS File

[56] References Cited

U.S. PATENT DOCUMENTS

| | | | |
|---|---|---|---|
| 3,308,436 | 3/1967 | Burck et al. | 364/200 |
| 3,473,160 | 10/1969 | Washlstrom | 340/750 |
| 3,979,728 | 9/1976 | Reddaway | 364/200 |
| 4,270,170 | 5/1981 | Reddaway | 364/200 |
| 4,380,046 | 4/1983 | Frosch et al. | 364/200 |

OTHER PUBLICATIONS

Blank, "A Parallel Bit Map Processor Architecture for DA Algorithms", 18th Design Automation Conference Proc., IEEE Computer Society and ACM, pp. 837–845, Jun. 1981.

Batcher, "Architecture of a Massively Parallel Processor", Proc. of the 7th Annual Symposium on Computer Architecture, IEEE, ACM, pp. 168–173, May 1980.

Unger, "A Computer Oriented Toward Spatial Problems", Proc. of the IRE, pp. 1744–1750, Oct. 1958.

*Primary Examiner*—David Y. Eng
*Attorney, Agent, or Firm*—Flehr, Hohbach, Test, Albritton & Herbert

[57] ABSTRACT

A single instruction multiple data parallel processor has a rectangular array of processing elements which is smaller than the array of data to be processed. The array of data to be processed is divided into a number of segments, each equal in size to the processing element array. Each processing element includes a memory for storing one or more data values corresponding to one data element in each of these segments of the data array. To execute an instruction on all the data, the processing elements execute the instruction on one segment of the data array at a time, repeating the process until all the data has been processed. To do this, a primary address controller generates a sequence of segment address values for each instruction to be executed. The processing elements along the periphery of the processing element array are called edge processing elements. An edge address controller generates edge address values corresponding to the segment addresses of the segments neighboring the segment currently being addressed by the primary address controller. Each processing element is coupled to its neighbors so that it can execute instructions which require access to neighboring data elements. To enable edge processing elements to access neighboring data elements, each edge processing element has special hardware for accessing data values stored in a memory location corresponding to one of the edge address values.

7 Claims, 5 Drawing Sheets

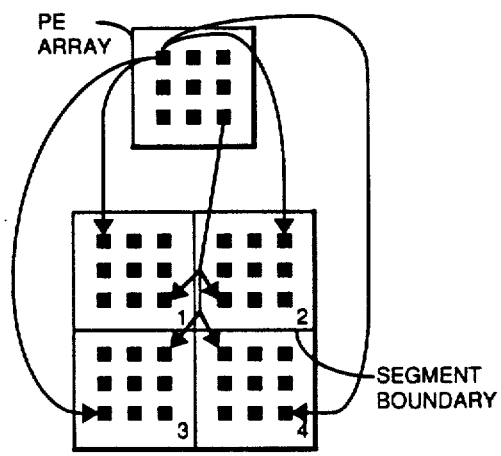
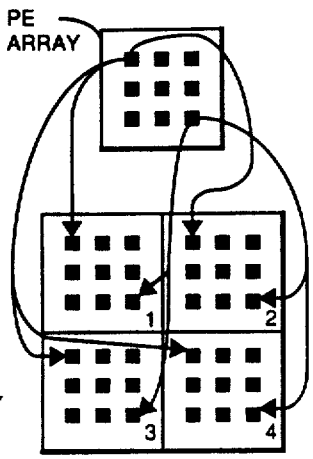
FIGURE 1A  FIGURE 1B
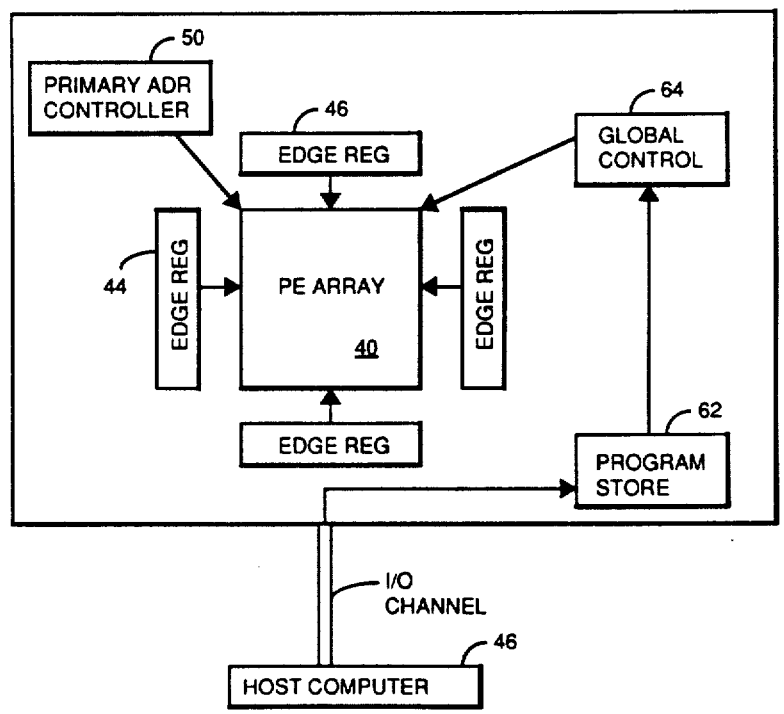
FIGURE 2

VIRTUAL BIT MAP PROCESSOR

LICENSE TO U.S. GOVERNMENT

This invention was made with U.S. Government support under Contracts Nos. DAAG-29-80-K-0046 and DARPA Contract MDA903-79-C-0680 awarded by the U.S. Army Rsearch Office and the Defense Advance Research Projects Agency, respectively. Pursuant to these contracts, the U.S. Government has certain rights in this invention.

CROSS REFERENCES TO RELATED APPLICATIONS

This application is a continuation of Ser. No. 07/306,270, filed Feb. 1, 1989, now abandoned, which was a continuation of Ser. No. 06/882,793, filed July 7, 1986, now abandoned, which was a continuation of Ser. No. 06/558,024, filed Dec. 5, 1983, now abandoned.

BACKGROUND OF THE INVENTION

This invention is directed to an expanded capacity virtual bit map processor and specifically to a processor using a unique memory configuration and address generation capability allowing a set of process elements to manipulate a data array that is larger than the number of processing elements.

The tremendous increase in circuit complexity created by advances in integrated circuit technology poses a serious challenge for computer aided design systems. Some designs may require days of computation time for synthesis or verification tasks. The increase in circuit size, complexity, and related growth in computational demand is creating an increasingly difficult design barrier. This invention is directed to a system and technique for penetrating the size/complexity barrier by exploiting the inherent parallelism of many circuit design problems which should significantly reduce the solution time. The system incorporates an array processor and cooperating registers for each processor to contain and operate on a problem having a number of data points which is much larger than the number of available processing elements.

Increasing system complexity is driving the solution time to design automation problems to unacceptable levels. The governing factors of solution time or computer run-time are: the algorithm's efficiency, the problem size and the host machine's speed. The objective is to reduce runtimes for current design automation problems within feasible economic constraints.

Since technological advances provide the capability for larger circuits, some combination of better algorithms or better machines is required if design times are to remain reasonable. Considerable improvements have been made on design automation algorithms for conventional machines; however, some problems like maze-routing have resisted significant run-time improvements. For some of these problems, the development of new hardware is a potential solution. Hardware solutions range from a faster general purpose computer to a single algorithm built into special purpose hardware.

An example of a faster machine is a CRAY-1. Its pipelined real-number processing capability is well suited for matrix manipulations used in design automation tasks like analog circuit simulation or process simulation. However, extensive real number capabilities do not necessarily correspond to improved performance for other required design automation tasks the mainly use simple bit operations.

Representative of special purpose hardware is a graphics machine that converts a list of polygons into a raster-scan format for display on a conventional television screen. Examples of special purpose hardware for design automation are a system which implements a one layer maze-router and a system which implements design rule checks for an integrated circuit mask specification.

As a third alternative, special hardware can be designed to efficiently implement a range of tasks. For example, pipelined array processors are often used to enhance floating point arithmetic operations. Image processing machines can also be considered special purpose hardware capable of implementing a range of tasks.

It is an objective of this invention to provide an architecture for manipulating simple bit data structures: one and two dimensional bit arrays. Bit data structures are used in many design automation applications: design rule checking, routing, and boolean vector manipulation. Since bit operations are usually slow on conventional computers, an efficient bit processing machine can greatly reduce the run-time of many design automation programs.

The viability of a particular solution is determined by economic factors: development risk/cost, hardware cost, useful lifetime, and flexibility. For example, a big machine can provide enhanced performance over a potentially wide range of problems, but the hardware cost is large. Special purpose hardware has a fixed application and potentially limited flexibility but can have enhanced performance at a reduced cost.

General purpose bit processing machines have not been built for design automation applications but have been used for image processing. Since very large bit processing rates are required for image processing applications, highly parallel machines have been used. Parallelism is achieved using two architectures: array and pipelined.

The difficulties with the previous approaches lies in the mismatch between image processing and design automation requirements. For example, none of the array processors are capable of being easily configured to process problems other than the size of the array or to access data from a specific location within the array. A serious limitation of the pipelined architecture is the inflexible data width. Since design automation bit processing requirements vary, a flexible architecture is required.

It is an objective of this invention to provide a parallel array architecture to implement a range of bit operations. A $N \times N$ array machine is disclosed which is capable of processing a virtual data array of dimensions $L \times M$, the problem array being of much greater size than the processor array. For a large system, the size of an individual processor is crucial. A cell architecture and instruction set have been proposed in a paper entitled "A Parallel Bit Map Processor Architecture for DA Algorithms," by T. Blank, M. Stefik and Willem van Cleemput, published in 18th Design Automation Conference proceedings pages 837–845, IEEE computer society and ACM June, 1981, and incorporated herein by reference.

General purpose bit processing machines have not been built for design automation purposes but have been used in the areas of cellular automation and image processing. Two different architectures are used: array and pipelined. The first machines proposed and built were configured as arrays. The Cytocomputer, Massively Parallel Processor, and LSI Adaptive Array Processor are known examples.

The computational requirements of image processing provides a large motivation for the development of bit processing architectures due to large image sizes. This is similar to certain DA problems where the bit map sizes are large and computationally expensive on SISD (Single Instruction and Single Data stream) machines. Typically, a picture is divided into a two dimensional lattice where each point on the plane represents the picture information at that point. Each picture element (pixel) represents the smallest resolution and is coded into m binary bits. Using this technique, an image can be represented in an $N \times N \times m$ binary array.

Considering array architecture, the first work on a two dimensional image processing architecture was done by Unger in the late 1950's. His idea was to store an $N \times N$ pixel image in an $N \times N$ array of processors. Ideally, there would be an $N^2$ speed improvement over a conventional SISD computer of the same cycle time.

His system was a classical SIMD (Single Instruction Multiple Data stream) machine wherein all processors operate synchronously on broadcast instructions from a master controller. Each processing element (PE) was a simple, one-bit machine with accumulator, six one-bit registers and direct connections with its eight nearest neighbors. In the 14 instructions, there were provisions for loading/storing the accumulator, boolean operations with the registers, operations into registers, boolean operations with the values of the four orthogonal neighboring accumulators, and finally, the capability to ripple values between many processor cells in the same instruction. An additional feature was the logical OR connection of all cells to the master controller which permitted data dependent master control. Using Unger's estimates, 170 logic gates and 11 memory elements would be required for each logic element. The basic instruction scheme proposed by Unger is utilized for the host computer in the proposed system; the scheme is disclosed in "A Computer Oriented Toward Spatial Problems", *Proceedings of the IRE*, pp. 1744–1750, IRE, October, 1958, incorporated herein by reference.

With a pipelined architecture, an image is processed by serially passing through individual processor stages. For an algorithm requiring N processing steps, one pass processing is possible using N stages. Otherwise, multiple passes must be made through the pipe.

The structure disclosed by Loughheed and McCubbrey in "The Cytocomputer, A Practical Pipelined Image Processor", IEEP, ACM, May, 1980 is an example. Each stage can perform two transforms: one based on the eight nearest neighbors values (including itself) and on all eight bits of its own pixel value where the function is preset by a master controller. The neighbor transform is capable of generating any function of the nine neighbor values which permits shifting, expanding, shrinking etc. of objects represented in the map. For the eight bit transformation of its own value, all 256 mappings are available. This permits ANDing, ORing, plane shuffling etc. For a problem that requires 100 neighbor or boolean operations, 100 pipeline stages are needed to complete the processing in one pass. If one neighbor, then one boolean operation is required 100 times, only 100 stages are needed for one-pass processing.

The system uses raster scan order which accesses the image pixels sorted, first by increasing x location then by increasing y location. Raster scan order is also used for generating television displays. The match between the serial data from a TV camera and the Cytocomputer's raster scan input format makes it a natural candidate for real time image processing applications.

An advantage of a pipelined architecture is its extensibility since additional stages are easily added by breaking only one pipe connection. However, the advantage is offset by the serial nature of a pipelined architecture. The classical pipeline problem is handling a data dependent branch instruction where the pipeline processors must be flushed and the data restored to the proper state at the time of the branch. Another potential problem is the fixed data width of the pipe (i.e. eight bits for the Cytocomputer). Processing is significantly more difficult to problems that require more bits than the pipe width. The serial pipeline nature also requires that the bulk storage be located elsewhere so there is no potential parallelism in data access.

It is an object of the present invention to provide an array processor wherein the only restraint on the size of a problem to be handled is the size of the memories attached to each processor, and the ability to generate addresses to uniquely address each problem data point.

In an array architecture, $N \times N$ one-bit processors are connected in a rectangular array where all processors synchronously perform the same instruction broadcast by a master controller. Each processor can exchange data directly with its nearest neighbors and is capable of bit-serial arithmetic operations. Global data communications are possible by taking the boolean OR or AND operations over the $N \times N$ processor region. The Massively Parallel Processor and the array processor built by NTT further described below are examples.

As of June 1982, the largest commercial array processor is the Massively Parallel Processor (MPP) described by K. E. Batcher, *Architecture of a Massively Parallel Processor*, IEE, ACM, May, 1980, pp 168–173.

The Array Unit (ARU) contains the $128 \times 132$ processing array. It is controlled by broadcast instructions from the Array Control Unit (ACU) which contains its own program store and can overlap its instruction execution with array control instructions. Higher level control and I/O interfacing is provided by the Program and Data Management Unit (PDMU). It is also capable of overlapping instruction execution with data I/O. Finally, a VAX 11/780 acts as the host computer.

Since the machine's primary application is image processing, each cell is tailored for that function. Each pixel value containing a variable number of bits is mapped onto a processor where both floating point and scalar operations are possible. Each processor is equipped with bitserial arithmetic capability and local memory. Also for image algorithms, each processor cell connects to its nearest four orthogonal neighbors; however, only shifting of the one-bit processor value is possible during each cycle. The basic machine operation is SIMD; however, data dependent operations are possible through the mask register since some instructions require a specific mask register state. Since image data is typically in a serial format and since computer mass storage devices are also serial, each processor is connected by a shift register which operates independently from the rest of the cell permitting efficient data movement into the array. At the edge of the processing array, external switching networks provide the capability to connect the processors in a serpentine fashion, wrapped around, or simply providing a constant data input.

Since performance was the primary objective hardware parallelism and the power of each processor is maximized. This causes the MPP system cost to be large. Additionally, the MPP does not have the ability to uniquely address the information in each processor or to reconfigure its processing size to dimensions larger than the number of processors.

An objective of the present invention is to provide both of these capabilities.

An array processor prototype is also disclosed which requires 1024 custom array processing chips and is controlled by a bit slice processor. All communication with the processing array is through a 32 bit data bus connected to one edge and a 150 bit broadcast control word. The array controller is connected to a host controller through an eight bit I/O channel to a host computer.

As disclosed in Digest of the IEEE International Solid State Circuit Conference by Sudo et al, in "An LSI Adaptive Array Processor", each processor is composed of three units: two data transfer units and a register/accumulator unit. Each unit is capable of performing simultaneous independent operations. Neighbor unit one is directly connected to its nearest orthogonal and diagonal neighbors permitting both signal propagation and reception from eight sources. Neighbor unit two only provides two-direction transfers, up and down. The register/accumulator unit is composed of two register banks containing 32 and 64 one-bit words, and an arithmetic unit capable of performing bit serial data operations. One of the most interesting features of each processor is control generation. The fundamental mode uses the instruction stream broadcast globally throughout the processing array; however, the global instructions are modified by the register contents located in each cell. This permits data-dependent operations so that subregions of the processing array can be specially configured. For example, the array could be conceptually divided into groups of eight bit words permitting a ripple carry to propagate within each word group.

However, the LSI Adaptive Array Processor cannot be reconfigured into problems larger than the number of physical processors or to uniquely address individual processors. The processing potential in each PE is significantly larger than the requirements for design automation problems.

In summary, the two basic bit processing architectures in the prior art are: pipeline and array. For use in design automation tasks, flexibility to adapt to a wide range of algorithms and data formats is important. Easy hardware expansion of the pipeline architecture is an advantage but is outweighed by its inflexiblity. The data storage is located outside of the machine and data dependant branches are difficult to efficiently control. The array architectures discussed possess greater flexibility but still fall short of the requirements for use in design automation algorithms. For example, no architecture can be configured to process problems larger than the number of physical processors or to read the information from a single processor.

The article by Blank Stefik, and Von Cleemput incorporated herein describes an N×N array procesor that overcomes some of the limitations and omissions of the previous architectures. Some details of the system components of this article are discussed below.

An objective of the present invention is to expand on the work disclosed in this article by an improved memory configuration and processing element addressing scheme. The article reviews the design of a very small processing cell that can be used to implement a very large system.

In the Bit Map Processor (BMP) of the above article, the major components of the proposed system architecture are:

Host Computer System

Broadcasts all instructions and data to the processing array. The instruction format used is similar to that of the Unger et al. article, incorporated above.

BMP Control

Regulates I/O between the host and the PE array.

Edge Control

Buffers the data exchange between the host computer system and the PE array. In the preferred embodiment of the present described invention, it serves to provide the data which would otherwise lie outside the boundary of the data array. As will be seen, this data, while not directly to be operated on, must be provided to afford execution of the Neighbor instruction.

PE Array

Contains an N×N array of bit processing elements. Instructions are broadcast to all processing nodes simultaneously, and all operations are performed synchronously. This machine is similar to a classical SIMD architecture except that both row and column select lines must be enabled before a processor may change state. Area selection permits the array to adapt to different data formats on an instruction by instruction basis and to address small regions.

Using a simple accumulator/register design, FIG. 7 shows a simple processor cell design. The function of each module shown in FIG. 7 is:

Cell Enable

The cell enable unit generates the only cell unique control signal, cell enable, which is generated from the logical AND of the row and column enable lines. This signal is used by the accumulator, register bank, and wire-OR circuits since they contain or transmit the only state information. Only cells enabled by both row and column selects are allowed to change state. The scheme for addressing each processing element is a key feature of the present invention, and as such will be discussed in greater detail below.

Reg Bank

The register bank is comprised of dynamic register cells. The cell refresh, read, and write circuits are included; however, the row and column selection circuits are not located within the cell boundary.

Accumulator

The accumulator is a one-bit register used as the default operand for all instructions. Since it is accessed on nearly every instruction, it can be a simple clocked storage register.

Wire OR I/O

The wire-OR unit OR's the accumulator value onto the global row and column lines if the cell is enabled. The unit also generates the logical OR of the row and column lines when they are used for cell input.

MUX

The accumulator input multiplexor simply selects between the three possible input sources: external data input, neighbor unit, and the logical unit (LU).

LU

The logical unit is used to calculate all the boolean instructions of two operands. A four to one multiplexor can implement the functions.

Neigh Unit

The neighbor unit performs the masked logical OR of five possible values: the accumulator and four orthogonal neighbors. The functionality of the present system is based on each processing element being able to access these five values. The entire function can be generated in one AND/OR gate.

Local Control Unit

The local control unit generates the primary control signals that are used throughout the entire cell. The inputs are the row and column select lines, clocks, and the opcode lines; the generated signals are: cell select, write memory, write accumulator, and MUX control.

The cell instruction set is divided into five categories: Boolean, load/store, read/write, enable and neighbor instructions. A complete instruction set is given in Blank et al article, incorporated herein by reference.

The system level instructions provide the capability to: read/write all system registers, set/clear all system registers, write the array instruction, and enable a region for cell operation. The enabled array region should be set in two distinct ways: either setting the lower and upper corners of a rectangular region or setting the row and column enable registers directly. App. B shows a proposed system instruction set.

In using the system described above, an N×N problem is mapped into $N^2$ processors. However, in this system as in all other known systems, problems that require more processor storage or are larger than the number of processors are highly penalized for moving data across the processing array boundary. Moreover, the practical economic fact is than an attempt to build an N×N machine for an N×N problem will likely fail since design automation problems are constantly changing and growing. The optimal machine architecture must be reconfigureable and able to contain problems larger than the number of processors.

An objective of the present invention is to describe such a processor.

The prior art has not been able to move beyond systems in which the problem is larger than the physical number of processors. This application is directed to a reconfigurable architecture capable of manipulating problems larger than the number of physical processors. An implentation for a K×K processor array capable of containing an L×M problem is disclosed.

The implementation depends in part on a mapping technique that allows an array processor to manipulate problems larger than the number of physical processors. The technique folds or cuts and stacks a problem onto the physical array so that each processor contains and operates on many problem points. Proper mapping allows the neighbor instruction, which requires two dimensional processor interconnections over the problem area, to be efficiently implemented. Finally, by requiring an even number of vertical segments, only one edge register is required; Similarly, only one horizontal edge register is required, if the folding technique is used.

Six basic concepts allow a small number of physical processors to efficiently manipulate a large problem:

1° Each Physical processor contains a large amount of accumulator and register storage in contrast to the processors described in the prior art.
2° The problem is completely contained within the physical processor array memory so the data isn't moving
3° Each processor contains and manipulates data from many problem points.
4° The mapping between physical processors and the virtual bit map is folded or cut and stacked for simplification of storage.
5° A highly efficient addressing scheme for addressing any data point within the vertical array is developed.
6° A simplified memory-processor element arrangement is described for each processing point. Three main types are necessary: a first for processor elements in the center of the array such as 5 (FIG. 1); a second for processor elements 6 on the edge of the array; and a third 7 for processor elements on the corners of the array. All three types are designed so a processor element may easily access its own value and the four values on either side of the element.

In an illustrative embodiment of the present invention, each bit processing element is a programmable logic array type 82S100, having 16 inputs, 8 outputs, and 48 available AND terms. It is programmed according to the algorithm of Appendix A.

In describing this invention, reference can be made to the following figures, to be explained in greater detail below.

BRIEF DESCRIPTION OF THE DRAWINGS

FIGS. 1A and 1B illustrate the relationship between the processing element array and the two potential methods by which data may be mapped onto the processor array.

FIG. 2 is a block diagram of the basic elements of the array processor of the invention.

DETAILED DESCRIPTION OF THE PREFERRED EMBODIMENT

Figure 3:
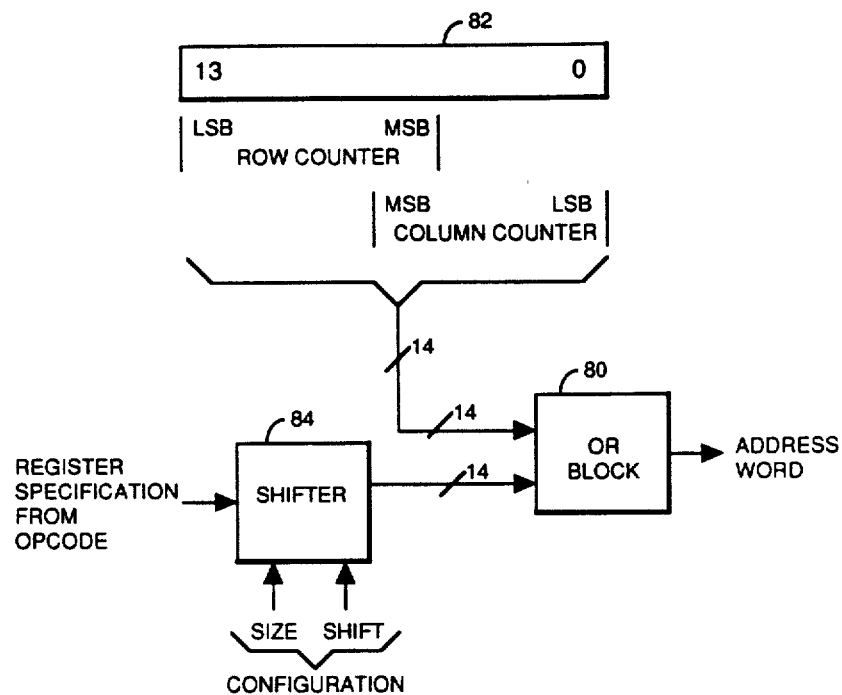
FIG. 3 shows the elements of the addressing scheme of the invention.

FIG. 1 shows the arrangement for a 3×3 processor array (each processor has a very large accumulator and register storage) mapped onto a 6×6 bit map problem. The problem is first broken into segments the size of the physical array (four 3×3 pieces for the example). Each processor stores one data point (in boolean values) from each of the segments; the assignments between the processor and problem points are folded along the segment boundaries, as shown in FIG. 1A. Folding the processor to problem assignments dictates that a processor located on the edge of the physical array will contain the data point located directly across the segment boundaries. A cut and stack approach, in which corresponding values have the same position with a segment, is also viable, and may be easier to implement; mapping the data points onto the array is shown in FIG. 1B.

An operation over the virtual bit map is processed one segment at a time where each processor performs the required instruction on its data. For example, the instruction acc:=acc AND reg1 on the 6×6 virtual bit map requires four steps:

1. Each processor AND's its segment-one accumulator value with its segment-one reg1 value.
2. Each processor AND's its segment-two accumulator value with its segment-two reg1 value.
3. Each processor AND's its segment-three accumulator value with its segment-three reg1 value.
4. Each processor AND's its segment-four accumulator value with its segment-four reg1 value.

The same technique can be used to implement all the basic instruction types (boolean, load/store, read/write, and neighbor) described above.

However, the neighbor instruction requires special attention since each processor takes the logical OR of its four orthogonal neighbors; this requires data from other data segments for processors located on the edge of the physical array. The mapping assignments between the physical processors and the virtual bit map dictate that processors located on the edge of the physical array always store the value of the corresponding bit map point located in the corresponding segment. Therefore, the neighbor instruction can be processed by accessing data located in either processor local storage or in an adjacent processor's storage for both the current and neighboring segment values. From a hardware point of view, the differences between implementing a fan-fold or cut-and-stack approach are not that great. The main issue resides in the design of the processors at the edges of the design, which must keep track of both new (processed) data and old (unprocessed) data for each point, as well as having access to data of odd and even numbered segments.

By increasing the storage associated with each processing element (PE) and folding or cutting and stacking the mapping between the physical processors and virtual bit map, very large problems can be manipulated given the novel addressing and memory addressing scheme adopted herein.

All the instruction types of the architecture including the neighbor instruction with a processor in each problem point can be implemented by a much smaller array processor. By defining the number of segments in terms of rows and columns, the edge values for the virtual bit map problem can be supplied from a limited number of registers, as shown in detail below. Certain advantages accrue from following the fanfold or cut and stack technique. The fanfold approach, as can be seen from FIG. 1A, has the advantage of not requiring wiring wrapped around the processor board, such wrapped wires are necessary in the cut an stack approach to transfer values from the opposite side of the segment.

The countervailing problem in the use of the fanfold technique is that while the processor element (PE) can get the value of the adjacent crossboundry point from its own memory i.e. for an even numbered segment being operated on, the processor element looks to the odd half of the memory system. The problem of course is that separate instructions must be provided to constantly change the controller's concept of left and right, depending on the point of the segment being processed.

Therefore the preferred embodiment of the invention to be discussed hereafter follows the cut and stack approach.

FIG. 2 shows the Virtual Bit Map Processor (VBMP) architecture having a processing array 40 as described above with respect to FIGS. 1A and 1B; edge registers 44 and 46 for storing values necessary to process Neighbor instructions which require data across a segment boundary, and a primary address controller 50 described in detail below which uniquely address every data point in each data segment to carry out data processing.

Note that the edge registers 44, 46 are only connected to the processing elements on the edge of the PE array 40 and are used to supply the address of the adjacent virtual segment operands for the neighbor instruction.

The system operates on problems in accord with programs stored in host computer system 60. Segments of the program are downloaded into Program Store 62, and the instructions exectuted by Global Control 64. These elements are all well developed in the array processing art; the instruction set is developed based on Unger's work and set out in detail in Appendix B with the specific PLA alogrithms in Appendix A. The local program store 62 contains part of the array program which is down-loaded from the host computer 60. The Virtual Bit Map Processor signals the host 60 when the execution is complete. The local store 62 was included to reduce the burden on the host 60 since the execution time of an instruction is extended due to the reduced number of processors.

It is of great importance to note that virtual processing requires two fundamental modifications of the structure in the Blank 82 article: each physical processor must contain more storage arranged in a manner to provide the access required by the neighbor instruction; and a new comprehensive address scheme is necessary. Both will be discussed in detail.

The primary address controller 50 supplies the register and accumulator addresses based on the register selected by the instruction and the current segment number. FIG. 3 shows the address calculation by the primary address controller 50 for a non-neighbor instruction.

The primary difference between the BMP of the prior art and VBMP processors of this invention is that the VBMP cell has a much larger register bank and that the single bit accumulator is replaced by an addressable accumulator set where the addresses for both the register bank and accumulator set are generated externally by an address controller as shown in FIG. 3 and discussed below.

The problem of generating a 14-bit (used in prototype) address to uniquely but quickly address each of 16,384 points in a vertical bit map array is solved using the addressing scheme of FIG. 3. The basis of the scheme is in using three words whose total number of bits amount to more than the number of bits in the required address word. In the specific scheme adopted, the row count and column count themselves provide more bits than necessary. Their least significant bits (LSB) are located at opposite ends of an address word register 82; as circuits combine overlapping bits. The advantage of this portion of the scheme is that both of the least significant bits are easily accessible so that adjacent data points may be accessed in the course of execution of the neighbor instruction. A third word developed from the op-code is also provided. The word is first shifted into desired ones of the final address word locations; the number of bits in this op-code word to be used is also selected using well known electronic techniques incorporated in block 84. Then the bits of this third word are OR'd with the word previously stored in block 82 by a block of OR-gates 80 to form the address word for addressing any point in the data array.

To use this scheme in the preferred embodiment, three 8-bit address words are combined to define a first 14-bit input to the OR-block 80. The two words, as shown, come from the Row and Column Counter and combined by a series of OR-gates in first address register 82. The other input to address control block 80 is an 8-bit word taken from the Op-code. The number of bits of this Op-code to be included in any address word is specified by a command SIZE received from the host computer at the block 84 labeled SHIFTER; the location of those bits in the 14-bit SHIFTER output is specified by the SHIFT command. The resulting 14-bit word is to be OR'd with the output of the row and column count register in OR-block 80, and results in a unique 14-bit word that can address any point in the array. An advantage of this format is that by specifying that each of the three 8-bit words always contributes n bits, $1 \geq n \geq 8$, the least significant bits of the row and column count always appear in the output address word. The result is that the processing element can address its four neighbor processing elements by adding and subtracting 1 to the row and column counts.

Figure 4:
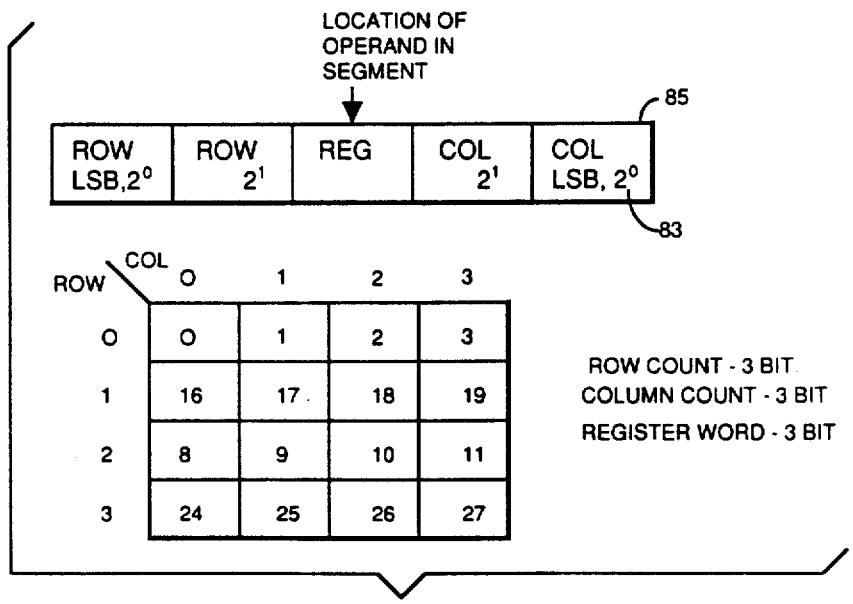
FIG. 4 is a numerical example of the addressing scheme of the invention.

An example of how this addressing scheme works on a smaller scale is shown in FIG. 4. Each of the Row, Column & Register Counts have 3 bits; but only 5 bits are being used to form the address word. The numbers which are thereby assigned to the segments are shown in FIG. 4. The segment numbering scheme shown in exemplary form in FIG. 4 uses a 5-bit address word to address all data points in the field. Increasing the column count (whose LSB lies all the way to the right at position 83) is used to number the segments moving across columns. Increasing the row count, whose LSB lies all the way to the left at position 85 changes the identification of the segment being processed vertically. Thus, the lower left segment sits in Row 3, Column 0. Its binary address is 11000, i.e. 24 in a decimal system. The top right is 00011, or 3 in decimal notation. Changing the character code which can mask one or more of the three counter bits identifies particular data points within segments.

Additional circuit connections between each processor element (PE) and associated memory elements is also required to implement the neighbor instruction on a virtual array. For the neighbor instruction, the accumulator values of the four orthogonal neighbors must be accessible to processor element (PE). Cells located in the middle of the physical PE array can directly access the neighbor values; however, cells located on the edge of the physical PE array require neighbor values that are contained in other segments or from the array edge. Referring again to the example in FIG. 1, processing the neighbor instruction in segment one requires values from the outside edges and from segments two and four.

Figure 5:
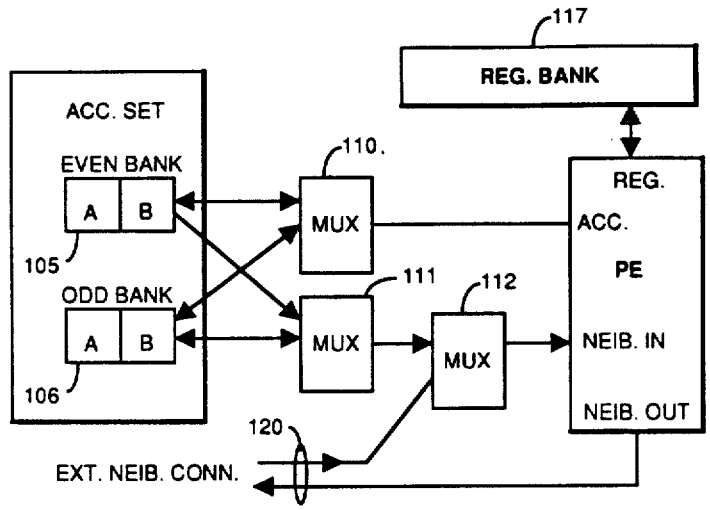
FIG. 5 shows the relationship of primary elements and processing elements for a corner processor designed in accord with this invention.
Figure 6:
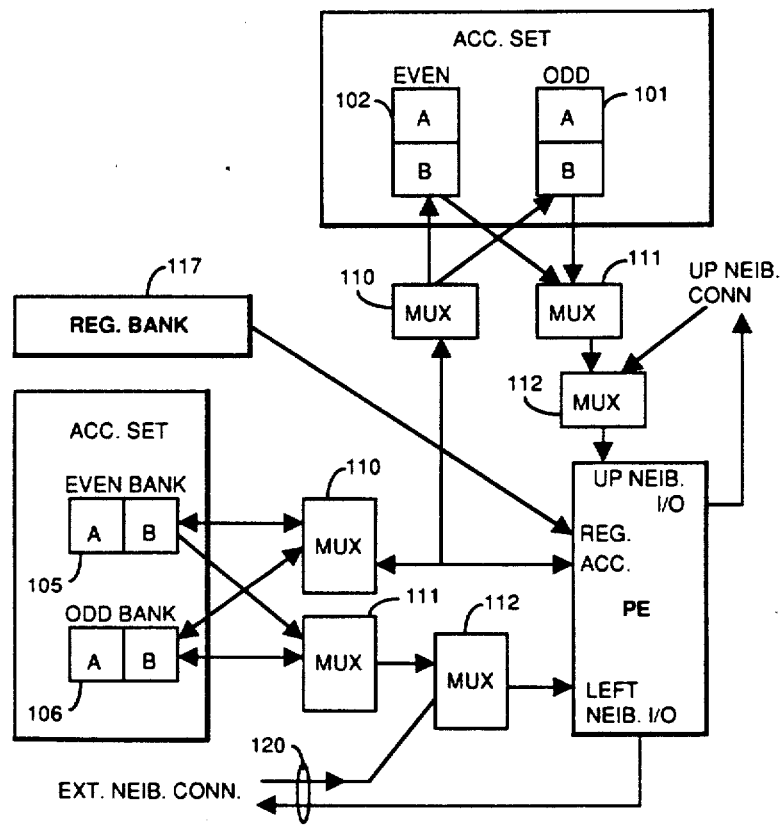
FIG. 6 shows the relationship of memory elements and processing elements for an edge processor.
Figure 7:
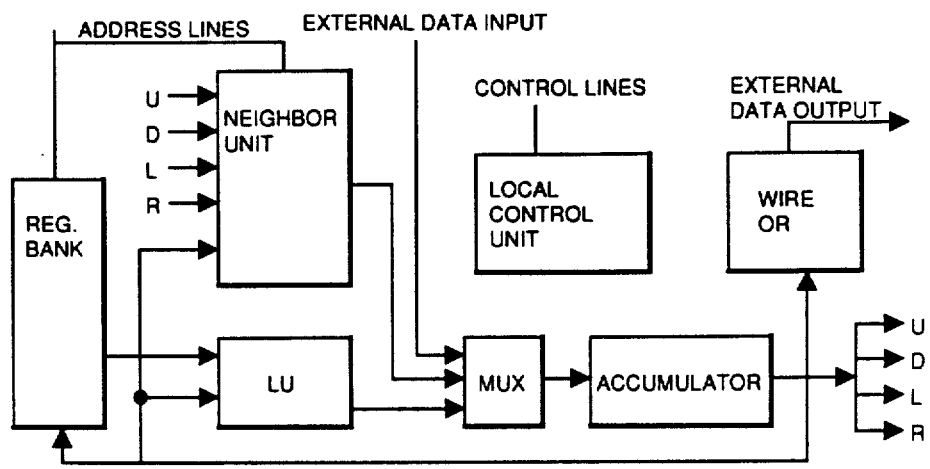
FIG. 7 is a block diagram of the basic elements of a processor element used in the array of elements in this invention.

Referring to FIGS. 5 and 6, the problem is solved by splitting the edge processor elements' accumulator sets into banks: four banks 101, 102, 103 & 104 for the processing elements located on the corners of the physical processing array, and two banks 105, 106 for all the other edge processors, permitting simultaneous access of different segment values. Addresses for each memory bank are provided by the addressing scheme described in detail above.

FIG. 5 shows the required connections for a processor located on the edge (not a corner) of the physical array. The banks are labeled "even" and "odd" to mark the location of the accumulator values for the even and odd numbered segments. The labels "even"/"odd" accumulator banks are used to relate this figure to the segments shown in FIG. 1, wherein odd segments border all even segments; the key rule is that all adjacent segment values are stored in alternate banks of memory so that they may be immediately accessed.

The multiplexers 110, 111, 112 provide the necessary switching between the two inputs to the processing element PE. The switch settings in the multiplexer for alternatively odd and even memory access calls are shown in FIG. 6; the terms "even", "odd", as noted above refer to the numerical designation of the segment being operated on using the segment numbering system of FIG. 1. The register bank 117 is provided for operations in the Z-axis, i.e., on larger than single bit words. The external neighbor connections 120 exist for situations where the necessary data resides in an edge register, rather than being stored in any segments; access is provided through multiplexer 112.

The final complication for implementing the neighbor instruction requires that a processor located on the edge of the processing array maintain a copy of its old accumulator value. This is necessary to implement the neighbor instruction defined as:

$$acc_{t+1} := North_t + West_t + South_t + East_t + acc_t$$

where t represents the time before the neighbor instruction and t+1 represents the time after the neighbor instruction is processed over the entire virtual bit map (note: the equation is shown with all mask bits set). If old accumulator values were not maintained, neighbor values across a segment boundary would be from time t+1 if the segment had been previously processed. FIG. 6 shows both accumulator banks separated into "a" and "b" parts for storing the time t and t+1 values, respectively.

The processors located on the four corners of the physical processing array use an extension of the edge processing technique. FIG. 6 shows the required connections and accumulator set configuration. Four independent banks 101-104 are required so that two neighbor values from different segments and the accumulator value from the current segment can be accessed simultaneously. The most important rule on this arrangement is that the accumulator value is written into both banks simultaneously.

The instruction set for the processing elements (PE) is set forth in Exhibit A and incorporated herein by reference.

The instruction set for this system follow at Exhibit B and is incorporated herein by reference.

Changes or modifications to this invention may become apparent to one of skill in the art without departing from the spirit or scope of this invention which is to be limited only by the following claims:

```
/*Please date and initial all changes!*
Creation 11/18/82 WTB
8/23/83 wtb corrected adds This file contains the equations of the PE opcodes inputs:

op0-6 are the opcode bits where op0 is the least significant
rega, regb register inputs
n1-n4 neighbor inputs
row,col select lines
cr carry input outputs:

out PE_output
Crout carry output
*/

Partno          pla07;
name            pe;
date            8/22/83;
revision        1;
designer        Tom Blank;
Company         Stanford Univ;

/* inputs */ pin [9..3]      = [op0..6];
pin 2           = row;
pin 27          = col;
pin 26          = n1;
pin 25          = n4;
pin 24          = n3;
pin 23          = n2;
pin 22          = rega;
pin 21          = regb;
pin 20          = cr;

/* outputs */ pin 18          = crout;
pin 17          = out;
/*
pin 16          = NC;
pin 15          = NC;
pin 13          = NC;
pin 12          = NC;
pin 11          = NC;
pin 10          = NC;
*/
size_gt4        = sz2 & sz3;                        /* > 11 */
                                                    /* > 12 */
size_gt5        = sz1 & sz2 & sz3 # sz0 & sz2 & sz3;
size_gt6        = sz1 & sz2 & sz3;                  /* > 13 */
size_gt7        = sz0 & sz1 & sz2 & sz3;            /* > 14 */

/* main equations */
```

```
D8  =   a7 & shift1 & size_gt7 #
        a6 & shift2 & size_gt6 #
        a5 & shift3 & size_gt5 #
        a4 & shift4 & size_gt4 #
        a3 & shift5 & size_gt3 #
        a2 & shift6 & size_gt2 #
        a1 & shift7 & size_gt1 #
        a0 & shift8 & size_gt0;

D9  =   a7 & shift2 & size_gt7 #
        a6 & shift3 & size_gt6 #
        a5 & shift4 & size_gt5 #
        a4 & shift5 & size_gt4 #
        a3 & shift6 & size_gt3 #
        a2 & shift7 & size_gt2 #
        a1 & shift8 & size_gt1;

D10 =   a7 & shift3 & size_gt7 #
        a6 & shift4 & size_gt6 #
        a5 & shift5 & size_gt5 #
        a4 & shift6 & size_gt4 #
        a3 & shift7 & size_gt3 #
        a2 & shift8 & size_gt2;

D11 =   a7 & shift4 & size_gt7 #
        a6 & shift5 & size_gt6 #
        a5 & shift6 & size_gt5 #
        a4 & shift7 & size_gt4 #
        a3 & shift8 & size_gt3;

D12 =   a7 & shift5 & size_gt7 #
        a6 & shift6 & size_gt6 #
        a5 & shift7 & size_gt5 #
        a4 & shift8 & size_gt4;

D13 =   a7 & shift6 & size_gt7 #
        a6 & shift7 & size_gt6 #
        a5 & shift8 & size_gt5;

D14 =   a7 & shift7 & size_gt7 #
        a6 & shift8 & size_gt6;

D15 =   a7 & shift8 & size_gt7;

/* Sfhi - Shift hi works in conjunction with the pla sflow. The combination
         performs two functions. First it shifts the register
         specification from 0 to eight bits and truncates the 8 bit
         register specification from 0 to eight bits. Ultimately, a
         sixteen bit word is created. All signals are active high.

inputs:
        a(0:7)  - register specification
        sf(0:3) - shift specification (0-8 only)
        sz(0:3) - size specification in bits (0-8)

outputs:
        D(8:15) - data outputs

*/ partno      pla06;
name        sfhi;
date        8/21/83;
revision    1;
designer    Tom Blank;
company     Stanford Univ;
```

```
/* inputs */ pin [9..6]      = [sf0..3];
pin [5..2]      = [sz0..3];
pin [27..20]    = [a0..7];

/* outputs */ pin [18..15,13..10] = [D8..15];

/* intermediate variables */ shift1  = sf0 & !sf1 & !sf2 & !sf3;
shift2  = !sf0 & sf1 & !sf2 & !sf3;
shift3  = sf0 & sf1 & !sf2 & !sf3;
shift4  = !sf0 & !sf1 & sf2 & !sf3;
shift5  = sf0 & !sf1 & sf2 & !sf3;
shift6  = !sf0 & sf1 & sf2 & !sf3;
shift7  = sf0 & sf1 & sf2 & !sf3;
shift8  = !sf0 & !sf1 & !sf2 & sf3;

/* The greater than variables need 9 values using 4 input lines; therefor,
   the equations are selected to minimize PLA terms */ size_gt0    = sz3 # sz2;                    /* x > 3 */
size_gt1    = sz3 # sz1 & sz2;              /* x > 5 */
size_gt2    = sz3 # sz0 & sz1 & sz2;        /* x > 6 */
size_gt3    = sz3;                          /* x > 7 */

/********** instructions ************/

/** neit and neibm **/

/* new value */ out = (rega&op0 # n1&op1 # n2&op2 # n3&op3 # n4&op4) &
        op5 & (!op6 & row & col # row & col & !regb)        #

/* old value */ rega & op5 & !(!op6 & row & col # row & col & !regb)    #

/* booleans */

/* new value */

!rega & !regb & op3 & op4 & !op5 &
        (!op6 & row & col # row & col & !regb)               #

/* old value */ rega & op3 & op4 & !op5 &
        !(!op6 & row & col # row & col & !regb)              #

/* new value */

!rega & regb & op2 & op4 & !op5 &
        (!op6 & row & col # row & col & !regb)               #

/* old value */ rega & op2 & op4 & !op5 &
        !(!op6 & row & col # row & col & !regb)              #
```

```
/* new value */

!rega & regb & op1 & op4 & !op5 &
        (!op6 & row & col # row & col & !regb)                          #

/* old value */ rega & op1 & op4 & !op5 &
        !(!op6 & row & col # row & col & !regb)                         #

/* new value */

!rega & regb & op0 & op4 & !op5 &
        (!op6 & row & col # row & col & !regb)                          #

/* old value */ rega & op0 & op4 & !op5 &
        !(!op6 & row & col # row & col & !regb)                         #

/*Sflow - Shift low performs two functions. First it shifts the register
         specification from 0 to eight bits and truncates the 8 bit
         register specification from 0 to eight bits.

inputs
        a(0:7)    - register specification
        sf(0:3)   - shift specification (0-8 only)
        sz(0:3)   - size specification in bits (2-8)

outputs:
        D(0:7)    - data OUTPUTS
*/

Partno    pla05;
name      sflow;
date      8/19/83;
revision  2;
designer  Tom Blank;
Company   Stanford Univ;

/* inputs */ pin [9..6]      = [sf0..3];
pin [5..2]      = [sz0..3];
pin [27..20]    = [a0..7];

/* outputs */ pin [16..15,13..10] = [D0..7];

/* intermediate variables */ shift0  = !sf0 & !sf1 & !sf2 & !sf3;
shift1  =  sf0 & !sf1 & !sf2 & !sf3;
shift2  = !sf0 &  sf1 & !sf2 & !sf3;
shift3  =  sf0 &  sf1 & !sf2 & !sf3;
shift4  = !sf0 & !sf1 &  sf2 & !sf3;
shift5  =  sf0 & !sf1 &  sf2 & !sf3;
shift6  = !sf0 &  sf1 &  sf2 & !sf3;
shift7  =  sf0 &  sf1 &  sf2 & !sf3;
```

/* The greater than variables need 9 values using 4 input lines; therefore,
   the equations are selected to minimize PLA terms */

```
size_gt1        = sz3 # sz1 & sz2;                  /* x > 5 */
size_gt2        = sz3 # sz0 & sz1 & sz2;            /* x > 6 */
size_gt3        = sz3;                              /* x > 7 */
size_gt4        = sz2 & sz3;                        /* x > 11 */
                                                    /* x > 12 */
size_gt5        = sz1 & sz2 & sz3 # sz0 & sz2 & sz3;
size_gt6        = sz1 & sz2 & sz3;                  /* x > 13 */
size_gt7        = sz0 & sz1 & sz2 & sz3;            /* x > 14 */
```

/* main equations */

```
D0 =    a0 & shift0;

D1 =    a0 & shift1;

D2 =    a1 & shift1 & size_gt1 #
        a0 & shift2;

D3 =    a2 & shift1 & size_gt2 #
        a1 & shift2 & size_gt1 #
        a0 & shift3;

D4 =    a3 & shift1 & size_gt3 #
        a2 & shift2 & size_gt2 #
        a1 & shift3 & size_gt1 #
        a0 & shift4;

D5 =    a4 & shift1 & size_gt4 #
        a3 & shift2 & size_gt3 #
        a2 & shift3 & size_gt2 #
        a1 & shift4 & size_gt1 #
        a0 & shift5;

D6 =    a5 & shift1 & size_gt5 #
        a4 & shift2 & size_gt4 #
        a3 & shift3 & size_gt3 #
        a2 & shift4 & size_gt2 #
        a1 & shift5 & size_gt1 #
        a0 & shift6;

D7 =    a6 & shift1 & size_gt6 #
        a5 & shift2 & size_gt5 #
        a4 & shift3 & size_gt4 #
        a3 & shift4 & size_gt3 #
        a2 & shift5 & size_gt2 #
        a1 & shift6 & size_gt1 #
        a0 & shift7;
```

/* addc */

```
        ( rega & !regb & !cr #
         !rega &  regb & !cr #
          rega &  regb &  cr #
         !rega & !regb &  cr ) &
        (!op3 & !op4 & !op5 & !op6)
```

/* Mvcr */

```
        cr & op2 & !op3 & !op4 & !op5 & !op6
```

/* input A */

```
/* new value */
        (row # col) & op1 & !op2 & !op3 & !op4 & !op5 &
        (!op6 & row & col # row & col & !regb)                  #
/* old value */
        rega & op1 & !op2 & !op3 & !op4 & !op5 &
        !(!op6 & row & col # row & col & !regb);

crout = rega & regb # cr & rega # cr & regb;
```

EXHIBIT B

SETINSTR *

Array instr. reg.:=Host Bus

SREAD(reg32)

5    Host Bus:=Edge(reg32)

SWRITE(reg32)

Edge(reg32):=Host Bus

SLOAD(reg)

tmp0:=Edge(reg)

10    SSTORE(reg)

Edge(reg):=tmp0

SSET(reg)

Edge(reg):=1

SCLR(reg)

15    Edge(reg):=0

SETLO(BITaddr)

tmp0:
        (bits (less than)BITaddr):=0
        (bits (more than)BITaddr):=1

```
SETHI(BITaddr)

tmp0:
        (bits)BITaddr) :=0
    ,
```

NOTES:

5   (reg32) refers to a specific 32 bit register which is either the
    upper or lower half of any 64 bit edge chip register.

(reg) refers to one of the eight edge registers. Registers 0-3 are
    temporary storage, reg. 4 is used for neighbor input, reg. 5 is
    used for neighbor output, reg. 6 is used for row/col. enable, and
10  reg. 7 is used for OR output.

(BITaddr) is the unique address of one-bit register.

What is claimed:

1. A single instruction multiple data parallel processor, comprising:
    an array of processing elements, including a plurality of edge processing elements along the periphery of said processing element array;
    memory means in each said processing element for storing a multiplicity of data value at specified address locations; said memory means collectively storing an array of data values, said array of data values comprising a multiplicity of segments, each said segment comprising a set of data values equal in size to said array of processing elements and stored at a corresponding segment address in said memory means;
    primary addressing means, coupled to all of said memory means, for generating a sequence of said segment addresses; said memory means including means for collectively accessing one segment of said array of data values for each said segment address generated by said primary addressing means;
    edge addressing means for generating a plurality of edge address values corresponding to each segment address generated by said primary addressing means, each edge address value comprising a segment address for a segment of said data array neighboring the segment of said data array corresponding to said segment address generated by said primary addressing means; and
    neighbor means in each said processing element for accessing data values from each of its neighboring processing elements; said neighbor means in each of said edge processing elements including edge accessing means, coupled to said edge addressing means, for accessing data values stored in one of said memory means at a location corresponding to one of said edge address values.

2. A single instruction multiple data parallel processor as set forth in claim 1, wherein said primary address means includes row address counter means for generating a sequence of binary row address values, column address counter means for generating a sequence of binary column address values, and means for combining said binary row address values and said column address values to generate said sequence of segment address values; each said binary value including a plurality of bits; said means for combining including means for reversing the order of the bits in one of said binary address values and for ORing the resulting binary value with the other one of said binary address values; whereby said segment address value has a fixed, predefined number of bits regardless of the number of rows and columns in said data array.

3. A single instruction multiple data parallel processor as set forth in claim 1, wherein each said memory means includes two data storage elements for each said segment address, including one storage element for storing an input data value and a second storage element for storing a computed data value computed by said processing element; whereby input data values are accessible by said edge accessing means even after computed data values have been stored by said processing elements in said memory means.

4. A single instruction multiple data parallel processor as set forth in claim 1,
    said memory means of each said edge processing element including two memory banks, said data values stored in said memory means of said edge processing elements being stored so that data values in neighboring ones of said segments are stored in different ones of said two memory banks;
    each said edge processing means including means for accessing a data value in one of said two memory banks at a location corresponding to said segment address generated by said primary address means, said edge accessing means in each said edge processing means including means for accessing a data value in the other one of said two memory banks at a location corresponding to one of said edge address values.

5. In a single instruction multiple data parallel processor, having an array of processing elements, including a plurality of processing elements along the periphery of said processing element array, and a set of memory means including memory means in each said processing element for storing a multiplicity of data values at specified address locations; a method of processing an array of data larger than said array of processing elements, the steps of the method comprising:

storing an array of data values in said set of memory means, said array of data values comprising a multiplicity of segments, each said segment comprising a set of data values equal in size to said array of processing elements and stored at a corresponding segment address in said set of memory means;

generating a sequence of said segment addresses and sending said segment addresses to said set of memory means for collectively accessing one segment of said array of data values for each said generated segment address;

generating a plurality of edge address values corresponding to each segment address generated by said primary addressing means, each edge address value comprising a segment address for a segment of said data array neighboring the segment of said data array corresponding to said segment address generated by said primary addressing means; and accessing neighboring data values for each said processing elements, said accessing step including the step of accessing, for each of said processing elements along the periphery of said processing element array, data values stored in one of said memory means at a location corresponding to one of said edge address values.

6. A method of processing an array of data as set forth in claim 5, wherein said step of generating a sequence of segment addresses includes the steps of generating a sequence of binary row address values, generating a sequence of binary column address values, and combining said binary row address values and said column address values to generate said sequence of segment address values;

each said binary value including a plurality of bits;

said combining step including the steps of reversing the order of the bits in one of said binary address values and ORing the resulting binary value with the other one of said binary address values;

whereby said segment address value has a fixed, predefined number of bits regardless of the number of rows and columns in said data array.

7. A single instruction multiple data parallel processor, comprising:

an array of processing elements, including a plurality of processing elements along the periphery of said processing element array;

memory means in each said processing element for storing a multiplicity of data values at specified address locations; said memory means collectively storing an array of data values, said array of data values comprising a multiplicity of segments, each said segment comprising a set of data values equal in size to said array of processing elements and stored at a corresponding segment address in said memory means;

primary addressing means, coupled to all of said memory means, for generating a sequence of said segment addresses; said memory means including means for collectively accessing one segment of said array of data values for each said segment address generated by said primary addressing means;

edge addressing means for generating a plurality of edge address values corresponding to each segment address generated by said primary addressing means, each edge address value comprising a segment address for a segment of said data array neighboring the segment of said data array corresponding to said segment address generated by said primary addressing means; and neighbor means in each said processing element for accessing data values from each of its neighboring processing elements; said neighbor means in each of said processing elements along the periphery of said processing element array including means, coupled to said edge addressing means, for accessing data values stored in one of said memory means at a location corresponding to one of said edge address values.

* * * * *